(12) United States Patent
Rezin

(10) Patent No.: US 9,073,770 B2
(45) Date of Patent: Jul. 7, 2015

(54) PORTABLE HIGH RATE ANAEROBIC DIGESTER APPARATUS AND METHOD OF OPERATION

(75) Inventor: Patrick D. Rezin, Tomah, WI (US)

(73) Assignee: USEMCO, INC., Tomah, WI (US)

( * ) Notice: Subject to any disclaimer, the term of this patent is extended or adjusted under 35 U.S.C. 154(b) by 1105 days.

(21) Appl. No.: 12/259,544

(22) Filed: Oct. 28, 2008

(65) Prior Publication Data

US 2010/0105128 A1  Apr. 29, 2010

(51) Int. Cl.
| | | |
|---|---|---|
| C02F 3/28 | (2006.01) | |
| C02F 11/04 | (2006.01) | |
| C02F 3/20 | (2006.01) | |
| C02F 1/00 | (2006.01) | |
| C02F 3/12 | (2006.01) | |
| C02F 103/20 | (2006.01) | |

(52) U.S. Cl.
CPC ............... C02F 11/04 (2013.01); *C02F 1/008* (2013.01); C02F 3/1242 (2013.01); C02F 3/28 (2013.01); *C02F 2103/20* (2013.01); *C02F 2201/006* (2013.01); *C02F 2203/008* (2013.01); *C02F 2209/42* (2013.01); *Y02E 50/343* (2013.01)

(58) Field of Classification Search
CPC .......... C02F 3/1242; C02F 3/28; C02F 11/04; C02F 1/008; C02F 2201/006; C02F 2203/008; C02F 2209/42; C02F 2103/20; Y02E 50/343
USPC ............... 435/262.5; 210/523, 525, 540, 241, 210/609, 535
See application file for complete search history.

(56) References Cited

U.S. PATENT DOCUMENTS

| | | | |
|---|---|---|---|
| 1,177,849 A | | 4/1916 | De Kalb |
| 2,023,295 A | | 12/1935 | Thackwell |
| 2,352,772 A | | 7/1944 | Darby |
| 2,613,180 A | | 10/1952 | Green et al. |
| 2,678,913 A | | 5/1954 | Kalinske |
| 2,889,929 A | | 6/1959 | Kivell |
| 2,964,179 A | | 12/1960 | Loevenstein et al. |
| 3,246,762 A | | 4/1966 | Sontheimer et al. |
| 3,298,526 A | | 1/1967 | Valdespino et al. |
| 3,397,788 A | | 8/1968 | Duff et al. |
| 3,622,009 A | | 11/1971 | Bordner |
| 3,705,648 A | | 12/1972 | Arvanitakis |
| 3,788,476 A | | 1/1974 | Othmer |
| 3,837,493 A | | 9/1974 | Lin |
| 3,920,550 A | * | 11/1975 | Farrell et al. ............... 210/86 |
| 3,923,652 A | | 12/1975 | Condolios et al. |
| 3,965,013 A | | 6/1976 | Jackson |
| 4,208,279 A | | 6/1980 | Varani |
| 4,302,329 A | | 11/1981 | Pfefferkorn |
| 4,350,588 A | | 9/1982 | Tsubota |
| 4,454,077 A | * | 6/1984 | Litz ............................ 261/91 |

(Continued)

OTHER PUBLICATIONS

J. Field, "Anaerobic granular sludge bed reactor," Sep. 15, 2002, 8 pages; printed from the Web at http://www.uasb.org/discover/agsb.htm.

(Continued)

*Primary Examiner* — Nathan Bowers
*Assistant Examiner* — Guatam Prakash
(74) *Attorney, Agent, or Firm* — Foley & Lardner LLP

(57) ABSTRACT

An apparatus for digesting waste includes a digester tank, a drainage trough located near a top of the digester tank, an auger located inside the drainage trough, and a skimmer that pushes waste into the drainage trough.

16 Claims, 4 Drawing Sheets

(56) References Cited

U.S. PATENT DOCUMENTS

| | | | | |
|---|---|---|---|---|
| 4,608,165 | A | * | 8/1986 | Galper ............................ 210/232 |
| 4,876,010 | A | * | 10/1989 | Riddle ............................ 210/525 |
| 5,228,995 | A | * | 7/1993 | Stover ............................ 210/603 |
| 5,441,634 | A | | 8/1995 | Edwards |
| 5,529,692 | A | | 6/1996 | Kubler |
| 5,635,393 | A | | 6/1997 | Bhatnagar et al. |
| 5,747,311 | A | | 5/1998 | Jewell |
| 5,798,043 | A | | 8/1998 | Khudenko |
| 5,866,002 | A | | 2/1999 | Yates et al. |
| 5,942,116 | A | * | 8/1999 | Clark et al. .................... 210/603 |
| 5,948,277 | A | * | 9/1999 | Frankenberger .............. 210/776 |
| 6,113,786 | A | | 9/2000 | Burke |
| 6,123,857 | A | * | 9/2000 | Brade ............................ 210/741 |
| 6,159,365 | A | | 12/2000 | Kigel et al. |
| 6,531,058 | B1 | | 3/2003 | Josse |
| 6,811,701 | B2 | | 11/2004 | Wilkie |
| 6,814,874 | B2 | * | 11/2004 | Ruehrwein .................... 210/744 |
| 6,884,351 | B1 | * | 4/2005 | Lytal ............................... 210/601 |
| 6,911,149 | B2 | | 6/2005 | Hansen et al. |
| 7,297,274 | B2 | | 11/2007 | Wilkie |
| 2005/0230308 | A1 | | 10/2005 | Hansen et al. |
| 2006/0065593 | A1 | | 3/2006 | Hansen et al. |

OTHER PUBLICATIONS

J. Field, "Granulation," Sep. 20, 2002, 6 pages, printed from the Web at http://www.uasb.org/discover/granules.htm.

C. S. Hansen et al., "Demonstration of Dairy Manure Remediation Using IBR Technology," 7 pages, 2002 Proceedings—Waste Research Technology, Utah State University, Logan UT 84322.

C. L. Hansen et al., "Improved Methane Production in an Anaerobic System Using a Methanogenic Upflow Anaerobic Sludge Blanket," presented at the 2000 ASAE Annual International Meeting, Midwest Express Center, Milwaukee, Wisconsin, Jul. 9-12, 2000.

C. S. Hansen, First (1 of 2) Power point presentation on IBR Anaerobic Digesters, 28 pages, Utah State University, printed from the Web at least as of Aug. 2, 2006.

C. S. Hansen, Second (2 of 2) Power point presentation on IBR Anaerobic Digesters, 17 pages, University of Utah, printed from the Web at least as of Aug. 2, 2006.

*A Quarterly Newsletter of the National Bioenergy Board, Ministry of Non-Conventional Energy Sources, Government of India*, vol. 6, No. 3, Sep. 2002, 8 pages, printed from the Web at http://www.undp.org.in/Programme/GEF/sep02/SEPT2002/article.

A. Kansal et al., "Anaerobic digestion technologies for energy recovery from industrial wastewater—a study in Indian context," *TERI Information Monitor on Environmental Science*, vol. 3, No. 2, pp. 67-75, Dec. 1998.

Y. Ma et al., "Study of Anaerobic Toxicity Assay and Cation Inhibition for Cheese Processing Waste," Paper No. 026055, presented at the 2002 ASAE Annual Int'l Meeting/CIGR XVth World Congress, Chicago, Illinois, Jul. 28-31, 2002.

S. Hwang et al., "Characterization of and Bioproduction of Short-chain Organic Acids from Mixed Dairy-processing Wastewater," *Transactions of the ASAE*, vol. 41, No. 3, pp. 795-802; published by American Society of Agricultural Engineers.

S. Hwang et al., "Formation of Organic Acids and Ammonia during Acidogenesis of Trout-processing Wastewater," *Transactions of ASAE*, vol. 41, No. 2, pp. 151-156; published by American Society of Agricultural Engineers.

* cited by examiner

PORTABLE HIGH RATE ANAEROBIC DIGESTER APPARATUS AND METHOD OF OPERATION

BACKGROUND

Farms, vegetable processing plants, meat processing plants, creameries and cheese processing plants, and restaurants have continually struggled with the disposal of organic waste. For example, pig farms produce tremendous amounts of pig manure. This manure has become the object of public controversy because of environmental concerns such as run-off pollution and odor.

Traditionally, organic waste is disposed of by using it as fertilizer in a farming operation. However, environmental regulations now restrict the time of the year and weather conditions during which manure, especially liquefied manure, can be spread; and, in some cases, require the manure to be plowed in immediately which is not always possible. This requires the farmer to invest in costly manure storage units or to pay to have the manure removed. Regulations also restricts the amount of nutrients, particularly phosphorus, that can be applied in a given area of land, requiring farmers to either purchase more land or to pay other land owners to spread the excess manure.

Anaerobic digestion is another method of disposing of manure containing high concentrations of organic matter. Through anaerobic digestion, large quantities of organic matter are broken down by bacteria that convert the organic matter into biogas. Anaerobic digestion is particularly suitable for disposing of liquefied manure containing high concentrations of organics. In addition, operators can also use or sell the biogas that is produced. In digested manure, nutrients are broken-down. Consequently, plants can absorb digested manure faster, thereby requiring less land to spread a given amount of manure.

Traditional anaerobic digesters suffer from plugging where heavy and light solids that precipitate from the organic waste coalesce into obstructions that prevent the flow of the effluent produced during digestion. The plugging occurs frequently and becomes a nuisance for the operator. Consequently, the operator (farmer, owner, etc.) devotes a considerable amount of time towards maintaining the anaerobic digester. Plugging of the digester interrupts the steady flow of the digestion process disturbing and slowing down the bacterial activity. Additionally, unplugging a digester risks the removal of the mass of bacteria that digest the organic material. If the bacteria population is diminished, it will take days before the bacteria repopulates to an optimal level. Complicating matters, increasing the rate of anaerobic digestion increases the amount of organic waste processed, which increases the frequency and severity of plugging.

Furthermore, traditional anaerobic digesters are typically semi-permanent installations and cannot be moved easily. To move a digester, a team would need to prepare a new site, disassemble the digester, and move the individual pieces to the new site. Then, an engineering team would reassemble the digester piece-by-piece. Consequently, it is expensive to move a digester. Thus, operations that are interested in using a digester only for a short time will be dissuaded from doing so.

For example, a crop processing plant produces a tremendous amount of waste during the harvest; hence, the need for a digester is great. However, during the growing season the need for digesters is diminished. Despite the periodic need, the crop processing plant does not invest in a permanent installation because of the capital requirements.

Therefore, there is a need for a high rate anaerobic digester that is portable, automated, and plugs infrequently.

SUMMARY

In a representative embodiment, an apparatus for digesting waste comprises a digester tank, a drainage trough, an auger, and a skimmer. The drainage trough is located near the top of the digester tank. The auger is located inside the drainage trough. The skimmer pushes waste into the drainage trough. The an apparatus for digesting waste also comprises a double valve chamber that purges heavy solids precipitated from the waste. A gas trap tank keeps the drainage trough air tight. The apparatus for digesting waste also comprises a propeller and a vertical pump tube.

In another embodiment, the apparatus for digesting waste can be constructed as a self-contained module which may be easily moved. A plurality of self-contained modules can be ganged together. Further, self-contained modules can be ganged together in series such that an output of a first of self-contained module is an input of a second of self-contained module. Self-contained modules can specializes in hydrolysis, acidogenesis, and methanogenesis. The apparatus for digesting waste can be divided between multiple chassis.

In another embodiment, a method of operating a digester apparatus comprises purging a digester apparatus. A controller controls the operation of a first valve and a second valve in order to purge heavy solids from the digester apparatus. The controller opens the first valve, fills the waste column, and closes the first valve, trapping heavy solids in the waste column. The controller opens the second valve, empties the waste column, and closes the second valve, forcing heavy solids out of the digester apparatus.

In another embodiment, a method of operating a digester apparatus comprises skimming a digester apparatus. A controller rotates the skimmer in a first direction, and rotates the skimmer in a second direction. The controller can also flick the skimmer against a drainage trough.

In another embodiment, a method of operating a digester apparatus comprises agitating a digester apparatus. An agitation cycle is selected based on the type of waste to be processed. The controller controls the operation of the propeller such that the waste in the digester apparatus is put into suspension. The agitation cycle changes dynamically based on changes in the type of waste.

DETAILED DESCRIPTION

A portable high rate anaerobic digester apparatus and method of operating are described. In the following description, for purposes of explanation, numerous specific details are set forth to provide a thorough understanding of exemplary embodiments of the invention. It will be evident, however, to one skilled in the art that the invention may be practiced without these specific details. The same number is used in the figures to represent the same element. The figures are not to scale. In other instances, well-known structures and devices are shown in simplified form to facilitate description of the representative embodiments.

Structure of the Digester Apparatus

Figure 1:
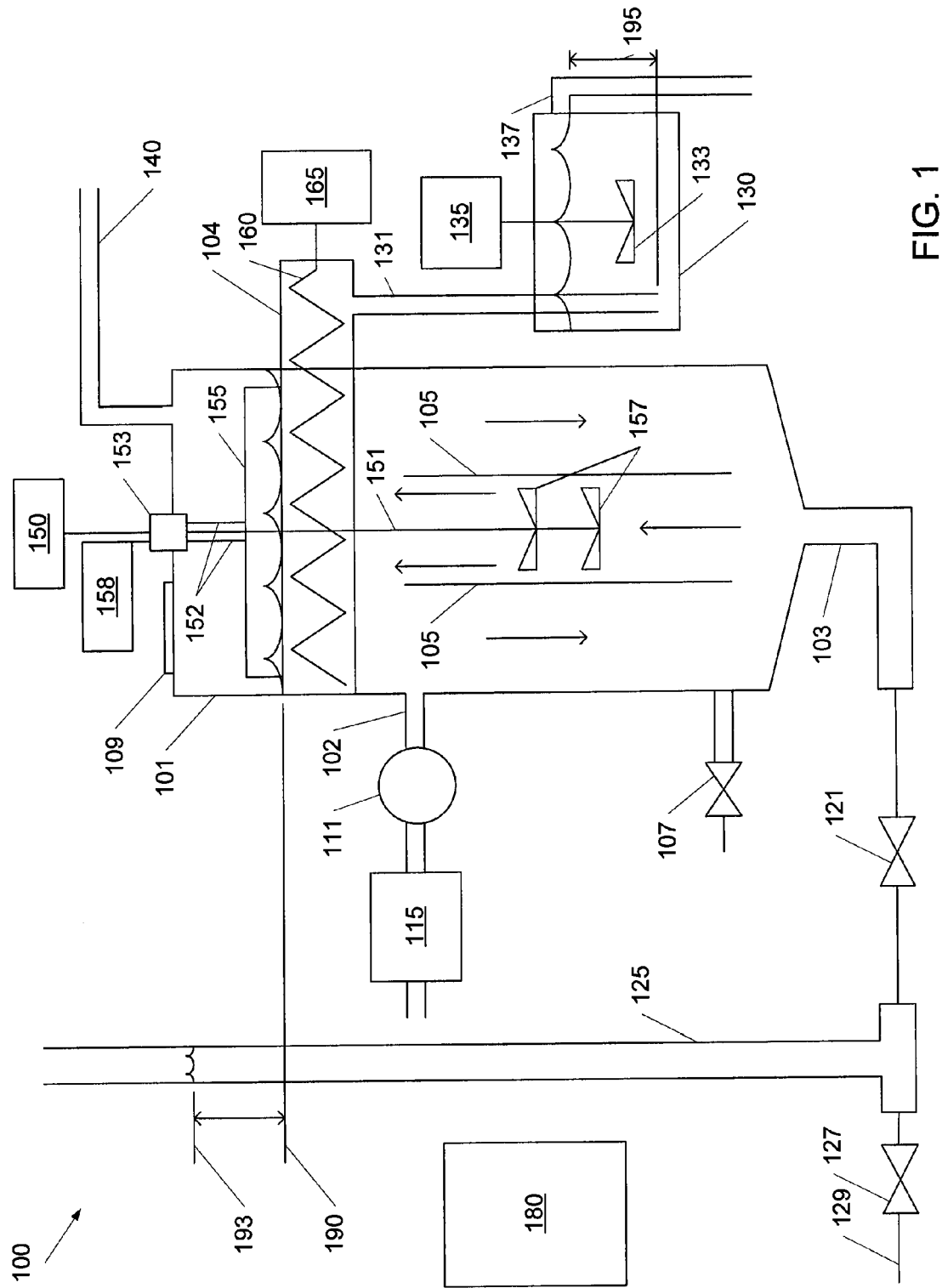
FIG. 1 is a representative block diagram of a digester system in accordance with a representative embodiment.

Referring to FIG. 1, a front view of a digester apparatus 100 in accordance with a representative embodiment is shown. The digester apparatus 100 includes a digester tank 101. The digester tank 101 includes a fluid inlet 102, a heavy solids outlet 103, a drainage trough 104, a vertical pump tube 105, a maintenance porthole 109, a transfer outlet 107, and a biogas outlet 140. The digester tank 101 is made out of steel; however, stainless steel, polyethylene, concrete, or other materials commonly used in vat construction can be used. The maintenance porthole 109 is used to access the digester tank 101 for maintenance purposes. The transfer outlet 107 is used to drain the digester tank 101 or transfer partially digested waste to another tank. The digester tank 101 also includes sampling ports and additional maintenance ports.

In a representative embodiment, the digester tank 101 is approximately 40-50 feet tall and 12-14 feet wide. The digester tank 101 holds 30,000-40,000 gallons. The ratio of the side walls to the diameter of the digester tank 101 is preferably 2.5-4.5. The bottom of the digester tank 101 has a conical shape.

The digester tank 101 is heated by a hot-water jacketed cone at the bottom of the digester tank 101 (not shown) supplied by a boiler (not shown). Placing heating elements outside of the tank eliminates internal obstructions which promote plugging. Alternatively, the digester tank 101 is heated by resistance-type heating elements wrapped around the body of the digester tank 101. Heating can also be accomplished with fluid-based heat exchangers, circulating glycol or water heated by a waste gas burner, disposed as coils inside the digester tank 101.

The digester tank 101 is insulated (not shown). The insulation can be a insulating blanket, for example, made of fiberglass. Alternatively, the digester tank 101 is double-walled and the cavity between the walls is filled with a polyurethane or isocyanate-type expanding foam.

During operation, the digester tank 101 is filled with an organic waste effluent such as manure. Bacteria, either added to the waste or naturally occurring in the waste, convert the manure into a number of products including biogas, water, light solids (specific gravity less than 1), and heavy solids (specific gravity greater than 1). The biogas degasses from the waste. The biogas produced is primarily methane (along with carbon dioxide and hydrogen sulphide) although designer bacteria can be introduced that produce other hydrocarbons. The light solids are typically animal bedding such as straw, sawdust, and other undigested animal food particles. The light solids rise to the top of the waste and heavy solids fall to the bottom of the waste.

The digester tank 101 is air-tight. The biogas exits the digester tank 101 through a biogas outlet 140. The biogas outlet 140 leads to a gas processing apparatus (not shown) that prevents backflow and regulates pressure. Biogas needs to be treated to remove water and other non-methane gases before it can be piped into the gas lines. The gas is then either used in powering the digester apparatus 100, piped to other on-site operations, or refined and distributed. For example, the digester apparatus 100 can be connected to a gas pipeline network.

The fluid inlet 102 is located on the side wall of the digester tank 101 underneath a digester tank waste material top level 190. The fluid inlet 102 is connected to a pump 111 and a heater 115. In a representative embodiment, waste material is pre-heated by heater 115 and pumped by pump 111 into the digester tank 101. The heater 115 may be after the pump 111 or may be a combination of both before and after the pump 111. In one embodiment, waste material is pumped into the digester tank 101 at a constant rate. Alternatively, waste material is pumped into the digester tank 101 on demand. The amount of waste pumped into the digester is measurable and controllable in order to control the hydraulic retention time.

The heavy solids outlet 103 is located at the bottom of the digester tank 101. The heavy solids outlet 103 is connected to the bottom of a waste column 125. The waste column 125 is a vertical cylinder such as a pipe. The waste column 125 is arranged as a double valve chamber where a first waste valve 121 separates the heavy solids outlet 103 and the waste column 125, and a second waste valve 127 separates the waste column 125 from a first lagoon outlet 129. The first lagoon outlet 129 is connected to a hose or pipe that empties into a lagoon or holding pond. Alternatively, the first lagoon outlet 129 can lead to a holding tank which is emptied periodically. The waste column 125 should be at least a height 193 that is one gas trap submersion height 195 above the digester tank waste material top level 190 so that heavy solids do not spill out of the waste column 125. The first waste valve 121 and the second waste valve 127 usually remain closed. Alternatively, the waste column 125, the heavy solids outlet 103, and/or the first lagoon outlet 129 have augers which can be used to move the heavy solids.

When enough heavy solids have collected at the bottom of the digester tank 101, the first waste valve 121 opens while the second waste valve 127 is closed. Hydraulic pressure forces the heavy solids into the waste column 125. The first waste valve 121 closes and the heavy solids are now trapped in the waste column 125. After the waste column 125 is full, the second waste valve 127 is opened while the first waste valve 121 remains closed. The heavy solids are forced out of the first lagoon outlet 129 and into a holding pond.

Figure 2:
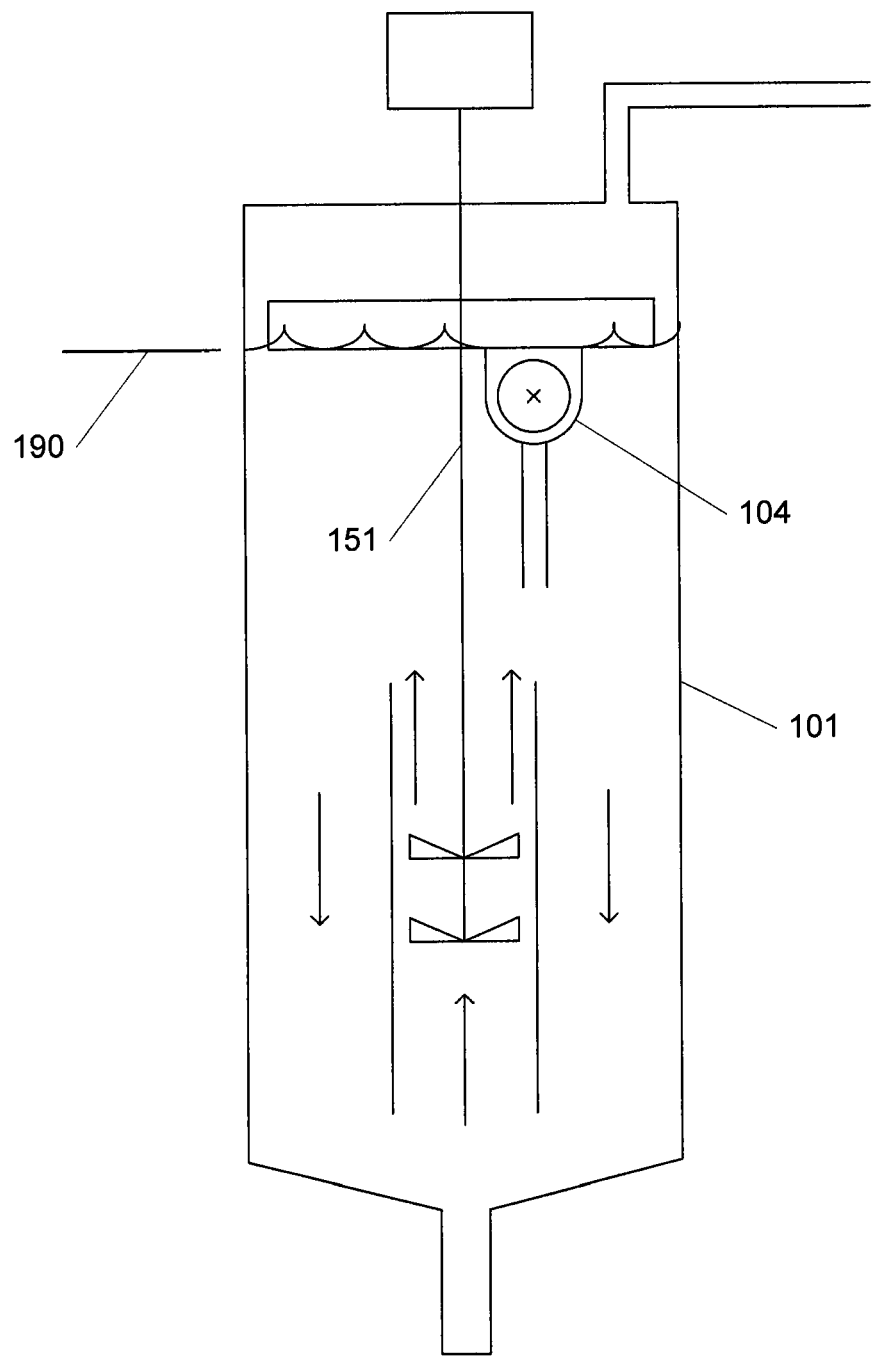
FIG. 2. is a side view of a digester apparatus in the digester system of FIG. 1 in accordance with a representative embodiment

Referring now to FIG. 2, a side view of the digester apparatus 100 of FIG. 1 in accordance with a representative embodiment is shown. The drainage trough 104 is located near the top of the digester tank 101 so that the top of the drainage trough 104 corresponds with the digester tank waste material top level 190. The drainage trough 104 is horizontal and offset from the center of the digester tank 101 so that a main drive shaft 151 can pass through the centerline of the digester tank 101. The drainage trough 104 is U-shaped. Hence, when light solids rise to the top of the waste, which corresponds to the digester tank waste material top level 190, the light solids fall into the drainage trough 104. Likewise, when the level of the waste rises past the digester tank waste material top level 190, the effluent at the top of the digested waste drains into the drainage trough 104. The portion of the drainage trough 104 that extends beyond the digester tank 101 is air-tight so that the biogas cannot escape.

Referring again to FIG. 1, an auger 160 runs across or near the center of the drainage trough 104. The auger 160 is driven by an auger motor 165. The auger 160 usually runs at a constant speed; however, the auger can be programmed to run periodically. When light solids fall into the drainage trough 104, the turning auger 160 pushes the light solids to the end of the drainage trough 104. Additional augers can be placed throughout the digester apparatus 100 wherever plugging is problematic.

At the end of the drainage trough 104 the light solids and effluent of digested waste fall into a drainage tube 131. The drainage tube 131 is connected to gas trap tank 130 where the light solids and effluent of digested waste are stored temporarily. The discharge end of the drainage tube 131 is submerged one gas trap height 195 into the liquid of the gas trap tank 130 in order to create a desirable operating pressure in the digester tank 101. The effluent of the gas trap tank 130 is drained off the top of the gas trap tank 130 through a second lagoon outlet 137. The second lagoon outlet 137 is connected to a hose or pipe that empties into a lagoon or holding pond. Alternatively, the second lagoon outlet 137 is connected to a holding tank that is emptied periodically. The drainage tube 131 can also have its own auger which prevents plugging.

The gas trap tank 130 is equipped with a mixer 133. The mixer 133 is driven by a mixer motor 135. The mixer 133 is used to agitate the light solids and effluent of digested waste whenever more waste is pumped into the digester tank 101.

The digester tank 101 includes an agitation and skimming system in order to promote digestion and prevent clogging. The vertical pump tube 105 is a tube of steel or stainless steel positioned vertically in the center of the digester tank 101 by fins (not shown) that are welded to the inside of the digester tank 101. Hence, organic waste and biomass can flow on the outside and inside of the vertical pump tube 105.

A propeller 157 is located inside of the vertical pump tube 105. The propeller 157 is connected to the main drive shaft 151 driven by a main motor 150. When propeller 157 spins, the waste material is pumped upward through the vertical pump tube 105 and allowed to return downward around the outer walls of the digester tank 101. Hence, a convection-like current is created. The recycling movement of the organic waste maintains the heavier solids in suspension and improves bacteria contact with the organic waste material. Additionally, the propeller 157 can be designed to pulverize and mix the organic waste material as it passes through the vertical pump tube 105.

A skimmer motor 158 drives a skimmer drive shaft 152. The skimmer drive shaft 152 and the main drive shaft 151 enter the digester tank 101 through a sealed coupling 153. The skimmer drive shaft 152 is concentric with the main drive shaft 151. The main drive shaft 151 typically spins much faster than the skimmer drive shaft 152. The sealed coupling 153 also prevents biogas from escaping the digester tank 101. The skimmer motor 158 and the main motor 150 can be run independently and at different, varying speeds. Alternatively, the main drive shaft 151 and the skimmer drive shaft 152 can be driven by the same motor; and relative angular velocity can be modified using a differential.

The skimmer drive shaft 152 drives a skimmer 155. The skimmer 155 is an arm or arms that skim the light solids off the top of the waste and into the drainage trough 104. In a representative embodiment, the arms have brushes attached so that the skimmer 155 can reach below the digester tank waste material top level 190 while the skimmer 155 rotates. However, the skimmer 155 is adjustable and can be positioned at various levels relative to the digester tank waste material top level 190 and the top of the drainage trough 104. Alternatively, the skimmer 155 can have a plain face or have a profile like a rake. The skimmer can be controlled to operate in either clockwise, counterclockwise, or alternating rotational direction to improve the removal of the lighter solids.

The digester apparatus 100 is automatically controlled by a controller 180. The controller 180 includes a programmable logic controller (PLC), motor contacts, motor controllers, relays, sensor inputs, outputs, and a human machine interface. The PLC operates the first waste valve 121, the second waste valve 127, the heater 115, the pump 111, the main motor 150, the skimmer motor 158, the auger motor 165, and the mixer motor 135. The PLC also controls the hot-water jacketed cone used to heat the digester tank 101. The PLC also monitors the state of the digester apparatus 100 using temperature sensors, pressure sensors, encoders, and proximity sensors. In particular, the digester apparatus 100 includes a variety of sensors that test the waste itself. Consequently, the controller can determine when the waste has produced the optimum yield of biogas, for example, by determining the temperature, pH, specific gravity, ratio of substrates, and hydraulic flowrate of the organic waste and digested effluent, or the amount of gas produced. A user can also override the automatic controls. The user can also remotely monitor and control the system. Alternatively, the controller 180 can be any computer or circuit.

Figure 3:
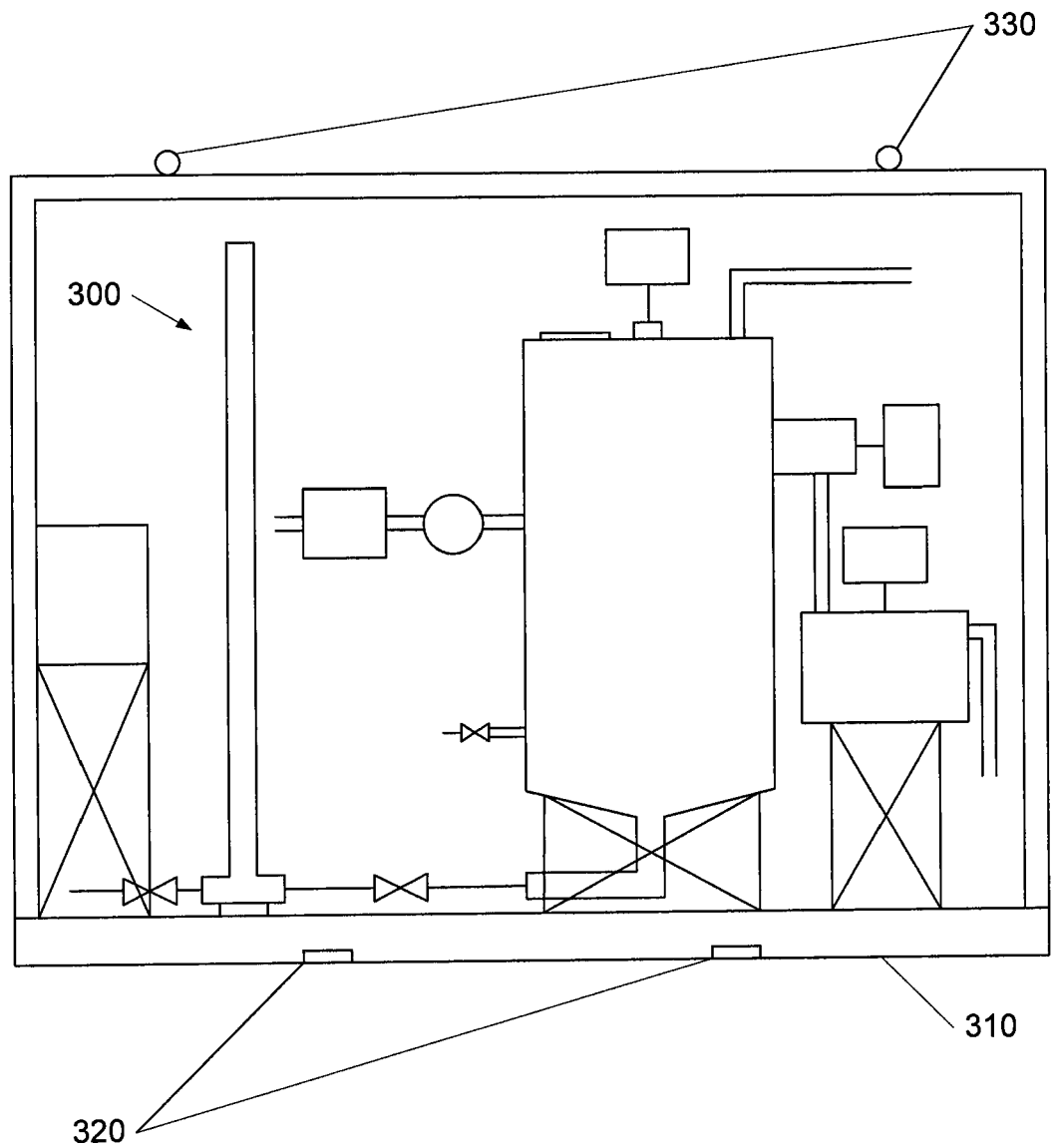
FIG. 3 is a flowchart of operations performed by a digester apparatus in accordance with a representative embodiment.

Referring to FIG. 3, a front view of a digester apparatus 300 mounted on a chassis 310 in accordance with a representative embodiment is shown. The digester apparatus 300 is mounted on the steel chassis 310 so that the digester apparatus 300 can be easily constructed at a factory and moved to a operations site. Hence, the digester apparatus 300 is packaged as a self-contained module or modules. Smaller versions of the digester apparatus 300 mounted on the chassis 310 can be moved by a crane and a flatbed truck using lifting points 330. Smaller versions of the digester apparatus 300 can be moved by a forklift and a trailer using skid holes 320.

Likewise, digester apparatus 300 can be easily broken into modules and split between a number of chassis. In a representative embodiment, a digester tank assembly comprising a digester tank and a waste column is 50 feet tall, including legs, and 14 feet by 14 feet wide. A separate module comprising a gas trap tank, a controller, pumps, heaters, and boilers is mounted on the steel chassis 310. The digester tank assembly and module are shipped to a site on separate flatbed trailers. The digester tank assembly is removed and positioned upright. The module is placed in proximity of the digester tank assembly. The installation team simply connects power, control wiring, and piping for the digester tank assembly and the module.

Hence, the digester apparatus 300 can be easily moved from site to site with minimal effort and without the support of an engineering team. The portability of digester apparatus 300 makes it easy for a factory or farm to rent a digester apparatus based on periodic need rather than invest in a permanent installation. Farmers, food processing plants etc. could also purchase the packaged digester through financing, using the digester as collateral. The digester would not become part of the real estate; it would be financed either through a bank or leasing company as a separate piece of equipment.

Additionally, a plurality of self-contained modules can be ganged together where a large amount of waste needs to be processed. A master self-contained module can direct the activity of the plurality of self-contained modules. For example, the master self-contained module can control the overall waste intake and direct which slave module receives new waste in order to prevent a bacteria mass from dying off.

In another embodiment, the gang of self-contained modules can also be placed in series where the output of one module is the input to the next module. Each self-contained module has a different kind of bacteria that performs a specific function, thereby increasing the efficiency and yield of the gang of modules. For example, bacteria X in module X works particularly well when the waste it digests is in a state Y. Bacteria W in module W produces a significant amount of biogas and a waste product in state Y. Hence the output of module W is fed into module X thereby increasing efficiency and yield of the overall system. Partially digested waste can be transferred out of a digester tank through a transfer outlet. Alternatively, waste captured by a gas trap tank can be used as input for another module.

More particularly, separate self-contained modules can be devoted towards specific anaerobic digestion stages, namely: hydrolysis, acidogenesis and methanogenesis. In another embodiment, a first self-contained module specializes in hydrolysis and acidogenesis. A second self-contained module takes the output of the first self-contained module and specializes in the methanogenesis stage.

Operation and Control of the Digester Apparatus

Figure 4:
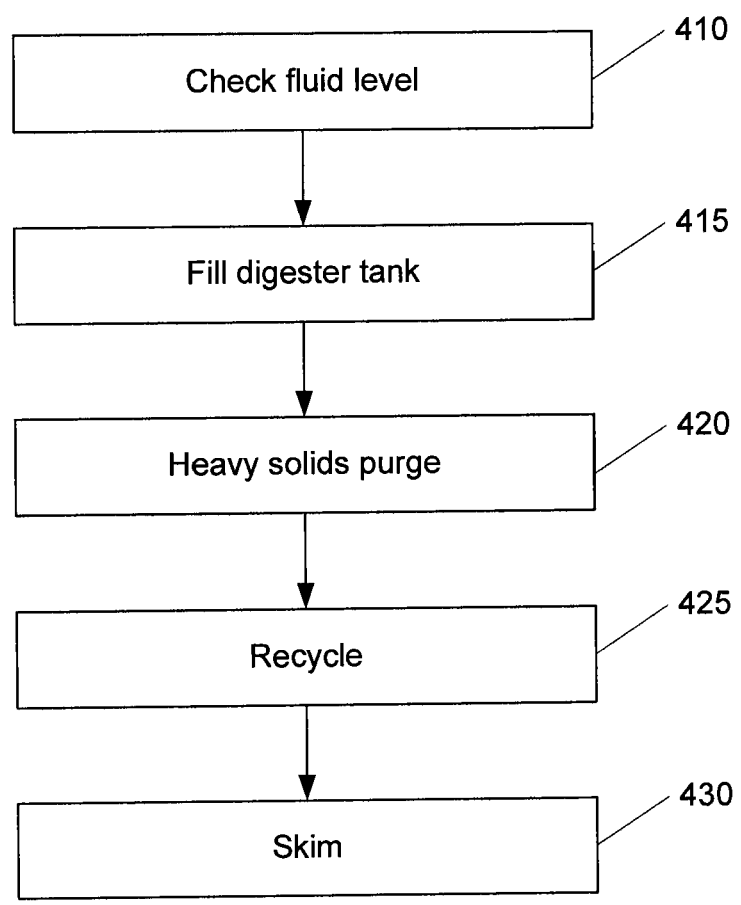
FIG. 4. is a front view of a digester apparatus mounted on a chassis in accordance with a representative embodiment.

Referring to FIG. 4, a flowchart of the operation of a digester apparatus in accordance with a representative embodiment is shown. The digester apparatus is automatically controlled by a controller. The controller performs the operations based on the ability of the digester apparatus to accept more waste, and in no particular sequence. In a representative embodiment, the waste is dairy cow manure. However, any organic waste can serve as feedstock for the digester such as farm animal manure, waste products from vegetable processing plants, meat processing plants, creameries and cheese processing plants, restaurant cooking oil, grease waste, etc.

In a check fluid level operation 410, the controller determines if the digester tank is full by reading a fluid proximity sensor located in the digester tank. Alternatively, the fluid level in the tank can be determined using a float and switch. If the digester tank is not full, the controller tries to fill the digester tank with more waste.

In a fill digester tank operation 415, the controller first determines if there is feed waste to fill the digester tank with. If there is waste available, the controller activates the heater. Once the feed waste is at an acceptable temperature, the controller activates the pump. The digester apparatus can operate at either mesophilic (95-98° F.) or thermophilic (140-145°) temperature range. The pump moves the heated waste into the digester tank. The controller also takes into account that the gas trap tank must be charged with effluent (raw organic waste). The controller also activates the mixer in the gas trap whenever the tank is charged with organic waste in order to assimilate overflow from the digester tank caused by additional filling.

After the digester tank is filled, the heater and pump continue to supply heated waste to the digester tank at a controlled feed rate. Feed rates can vary in order to obtain a hydraulic retention time from 5 to 20 days based on the quality of the waste and the mass of bacteria available to digest. The controller can dynamically alter the retention time based on how quickly the waste is digested.

The amount organic waste pumped into the digester relates to the digester retention time: (Digester Volume)/(Volume/Day)=Retention Time in Days. As raw manure is pumped into the digester, the waste level will rise and the digested effluent will flow into the drainage trough thereby maintaining the desired operating level. A float, proximity switch, ultrasonic sensor, or other kind of fluid level switch can sense an over fill situation that indicates a plug.

As the waste digests, heavy solids that have a specific gravity higher than water fall out of suspension and accumulate in the cone at the bottom of the digester tank. After a sufficient amount of heavy solids have accumulated, in a heavy solids purge operation 420, the controller moves the heavy solids to the waste column. The heavy solids purge operation 420 is designed to retain as much active bacteria as possible, thereby reducing the hydraulic retention time. As described above, the waste column is arranged as a double valve chamber.

During normal operation, the first waste valve and the second waste valve of the waste column remain closed. When controller determines that enough heavy solids have accumulated, through time and measurement, the controller opens the first waste valve. The accumulated heavy solids are forced up into the waste column through the hydraulic force of the waste material in the digester tank. The controller closes the first waste valve after the fluid levels in the waste column and digester tank are in hydraulic equilibrium. It may be desirable to leave some heavy solids in the bottom of the digester tank in order to maintain a seal that will prevent effluent from leaving the digester tank. Alternatively, the controller may use a number of iterations to fill the waste column.

After the waste column is full, the controller opens the second waste valve. The captured heavy solids are forced out of a first lagoon outlet and into a lagoon or holding pond. Alternatively, the first lagoon outlet can lead to a holding tank which is emptied periodically. Afterward, the controller closes the second waste valve.

In a recycle operation 425, the controller activates the propeller. The controller runs the main motor constantly or periodically. When the propeller spins, the organic waste material is pumped upward through the vertical pump tube and allowed to return downward around the outer walls of the digester tank. The controller also varies the pump speed to obtain the optimum internal hydraulic velocity in order to maximize the amount of solids in suspension. The recycling movement of the organic waste maintains the heavier solids in suspension and improves bacteria contact with the organic waste material. Lighter, fibrous material floats to the top of the digester tank.

In another embodiment, the propeller can be programmed to create different suspension profiles. For example, the blades of the propeller can be programmed to act similarly to the agitator of a washing machine. Hence, various agitation cycles can be created to handle different types and qualities of waste.

In a skim operation 430, the controller activates the skimmer and the auger. The accumulation of the lighter, fibrous material is removed by a skimmer with two rotating sweep arms. The skimmer moves over the top of and against the floating solids thereby pushing the solids into the discharge trough. The skimmer can be rotated at various speeds and in different directions. In a representative embodiment, the skimmer is rotated in a first direction alternating with a second direction. In another embodiment, the skimmer is rotated for an extend period of time in one direction and periodically reversed to knock accumulated waste off of the skimmer. In another embodiment, the skimmer is programmed to flick accumulated waste off of the skimmer by quickly running the skimmer blades back and forth over the edge of the drainage trough.

In the skim operation 430, the controller also activates the auger motor. Whenever the skimmer is running, the auger should also run in order to prevent plugging of the discharge trough. As the solids enter the discharge trough, the auger pulls the solids towards the discharge tube where the solids fall into the gas trap tank. The auger can be reversed to un-jam plugs.

Advantageously, the check fluid level operation 410, the fill digester tank operation 415, the heavy solids purge operation 420, the recycle operation 425, and the skim operation 430 work together to increase the rate of anaerobic digestion and keep the digester apparatus unplugged. Additionally, the digester apparatus processes organic waste automatically at a high rate and plugs infrequently. Additionally, the digester apparatus can be easily manufactured at a factory and then be moved easily from site to site.

The foregoing description of representative embodiments has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. An apparatus for digesting waste, comprising:
   a digester tank;
   a vertical pump tube disposed within the digester tank;
   a propeller disposed within the vertical pump tube and configured to pump a waste material upward through the vertical pump tube from a bottom of the digester tank towards a top of the digester tank, wherein the waste material comprises heavy solids that fall to the bottom of the digester tank and light solids that rise to a waste material top level located near the top of the digester tank;
   a controller configured to operate the propeller to maintain at least a portion of the heavy solids in suspension within the waste material in the digester tank during at least part of a recycle operation;
   a drainage trough configured to collect the light solids that rise to the waste material top level;
   an auger, wherein the auger is located inside the drainage trough and is configured to pull the light solids collected by the drainage trough toward a discharge tube of the digester tank;
   a skimmer; and
   a heavy solids outlet tube located at the bottom of the digester tank through which the heavy solids are purged from the digester tank,
   wherein the skimmer pushes the light solids over the edge of the drainage trough and into the drainage trough, and
   wherein a top portion of the vertical pump tube is disposed far enough below the waste material top level such that the heavy solids fall to the bottom of the digester tank after being propelled up the vertical pump tube rather than being propelled to at or above the waste material top level and discharged through the drainage trough and discharge tube.

2. The apparatus of claim 1, further comprising:
   a double valve chamber,
   wherein heavy solids precipitated from the waste are purged from the digester tank.

3. The apparatus of claim 2, wherein the double valve chamber includes:
   a first valve;
   a second valve; and
   a waste column;
   wherein the first valve and the second valve are located at the bottom of the waste column.

4. The apparatus of claim 3, further comprising:
   a gas trap tank,
   wherein discharge from the drainage trough is stored in the gas trap tank.

5. The apparatus of claim 4, wherein the waste column is at least as high as a digester tank waste material top level plus a gas trap submersion height.

6. The apparatus of claim 5,
   wherein the controller automatically operates the double valve chamber.

7. The apparatus of claim 5 wherein the digester tank has a height to width ratio between 2.5 and 4.5.

8. The apparatus of claim 1, wherein the drainage trough is offset from the center of the digester tank.

9. The apparatus of claim 1, wherein the drainage trough is U-shaped and is positioned horizontally, wherein an edge of the drainage trough is positioned at the waste material top level.

10. The apparatus of claim 1, wherein the propeller pulverizes the waste.

11. The apparatus of claim 10, further comprising:
    a chassis,
    wherein the apparatus for digesting waste is a self-contained module and may be easily moved.

12. The apparatus of claim 11, wherein the apparatus for digesting waste is divided between multiple chassis.

13. The apparatus of claim 11, wherein a plurality of self-contained modules are ganged together.

14. The apparatus of claim 13, wherein a plurality of self-contained modules are ganged together in series such that an output of a first of self-contained module is an input of a second of self-contained module.

15. The apparatus of claim 14, the first of self-contained module specializes in hydrolysis and acidogenesis and the second module specializes in methanogenesis.

16. The apparatus of claim 1 wherein the skimmer further comprises a brush.

* * * * *